(12) United States Patent
Chien et al.

(10) Patent No.: US 6,189,797 B1
(45) Date of Patent: Feb. 20, 2001

(54) TRANSMISSION DEVICE FOR CARD READER COMPRISING TRANSMISSION AND WORM SHAFTS

(75) Inventors: Shen-Yuan Chien, Taipei Hsien; Jaw-Horng Tzeng, Kaosiung Hsien, both of (TW)

(73) Assignees: Industrial Technology Research Institute, Hsinchu; Singular Technology Corporation, Taipei, both of (TW)

(*) Notice: Under 35 U.S.C. 154(b), the term of this patent shall be extended for 0 days.

(21) Appl. No.: 09/168,063

(22) Filed: Oct. 8, 1998

(30) Foreign Application Priority Data

May 29, 1998 (TW) .................................................. 87208400

(51) Int. Cl.[7] .................................................... G06K 13/00
(52) U.S. Cl. ............................................ 235/475; 235/482
(58) Field of Search ...................................... 235/475, 479, 235/482, 483, 486

(56) References Cited

U.S. PATENT DOCUMENTS

| | | | |
|---|---|---|---|
| 3,818,500 | * 6/1974 | Lemelson | 360/2 |
| 5,175,423 | * 12/1992 | Kayan | 235/477 |
| 5,225,666 | * 7/1993 | Amarena et al. | 235/476 |
| 5,332,890 | * 7/1994 | Kitahara | 235/440 |
| 5,514,856 | * 5/1996 | Kitahara et al. | 235/440 |
| 5,689,105 | * 11/1997 | Mizoguchi et al. | 235/475 |
| 5,917,177 | * 6/1999 | Owa et al. | 235/486 |

* cited by examiner

*Primary Examiner*—Thien M. Le
*Assistant Examiner*—Daniel St. Cyr
(74) *Attorney, Agent, or Firm*—Rabin & Champagne, P.C.

(57) ABSTRACT

A card transmission device includes a motor and a shaft connector, a worm shaft with worms on both ends thereof, two transmission shafts with one end engaging with the worm and another end having a transmission pulley, and a driven pulley arranged below the transmission pulley, whereby the motor rotates the transmission shaft to enable the transmission pulley and the driven pulley to clamp and move the card. By the inventive device, the advantages of compact size, broad applicability and fewer accessories can be achieved.

11 Claims, 4 Drawing Sheets

TRANSMISSION DEVICE FOR CARD READER COMPRISING TRANSMISSION AND WORM SHAFTS

FIELD OF THE INVENTION

The present invention relates to a transmission device for card reader, more particularly, to a transmission device for a card reader, which has the advantages of compact size and broad applicability.

BACKGROUND OF THE INVENTION

There are more than one billion of recording cards in currency since the first card recorded with data appeared in 1920, and the recording cards are omnipresent in daily life. The categories of recording cards include ID cards for personal identification, cash cards for drawing cash, credit cards for purchase . . . etc. Beside the function aspect, the material, configuration, and recording/reading mechanism of those cards are different. For example, the recording card can be recorded with bossed letter, bar code, information stored in IC (IC card) or optical storage (optical card). Moreover, the security and degree of convenience of the card also depends on the material used and the recording/reading mechanism.

More particularly, the IC cards are provided with an IC chip for recording data (ISO 7816) and the terminal thereof is in static connection with a suitable connector. The applications of such IC cards include cash card, ID card . . . etc. The magnetic card is provided with a magnetic strip on one side thereof (ISO 7811) and the data stored in the magnetic strip is accessed by a dynamic magnetic head. The magnetic card can be accessed by part of the ATM machine. Another kind of magnetic card an all magnetic card, has a thinner structure and the data thereof can be recorded everywhere on the card. The all magnetic card can be, for example, a copy card, and has no particular specification. Besides, the transmission method of the card reader includes automatic type and a manual type. The automatic card reader has card transmission means for feeding or ejecting the card.

The transmission device of the conventional card reader includes a gear-transmission type and a belt-transmission type. As shown in FIGS. 2 and 3, the conventional gear-type transmission device comprises a motor (DC motor) 10a, a driving pulley 11a, a transmission pulley 12a and a driven pulley 13a. The motor 10a sends transmission power to the transmission pulley 12a through the deceleration of the driving pulley 11a. The driven pulley 13a is arranged below the transmission pulley 12a to clamp and move the card 14a. To minimize the constitutional parts of the device, the device employs single pulley arrangement.

As shown in FIG. 3, the conventional belt-type transmission device comprises a motor 15a, belt pulley set 16a, 17a, transmission pulley 18a, and driven pulley 19a. The motor 15a is decelerated by the driving pulley (not shown) and moves the belt-pulley set 17a and transmission pulley 18a through the belt-pulley set 16a, thus enabling the transmission pulley 18a and the driven pulley 19a to clamp and move the card 20a. The transmission device can move the whole card because the belt has a long-distance conveying ability.

The above-mentioned card transmission devices can convey a card in a steady, manner however, there are still some problem. The pulley-type card transmission device is only applicable to an all-magnetic card (thin card), and is not applicable to ISO 7811 magnetic cards. The belt-type card transmission device has a broader applicability, i.e., it can be used with ISO 7811 magnetic cards, and ISO 7816 IC cards. However, the conventional belt-type card transmission device has a bulky size and can not be applicable to all-magnetic cards (thinner card) because the thin card is liable to deform by the height difference among the transmission pulleys 18a. Moreover, the lifetime of the belt is limited.

SUMMARY OF THE INVENTION

It is the object of the present invention to provide a card transmission device with broad applicability for use with ISO 7811 magnetic cards, ISO 7816 IC cards and all-magnetic cards, and having a compact size, and without the problem of a limited lifetime of a belt.

To achieve the above object, the present invention provides a card transmission device comprising a motor with a shaft connector, a worm shaft with worms on both ends thereof, two transmission shafts with one end engaging with a worm and another end having a transmission pulley, a driven pulley arranged below the transmission pulley, whereby the motor rotates the transmission shaft to enable the transmission pulley and the driven pulley to clamp and move the card.

The various objects and advantages of the present invention will be more readily understood from the following detailed description when read in conjunction with the appended drawing, in which:

DETAILED DESCRIPTION OF A PREFERRED EMBODIMENT

Figure 2:
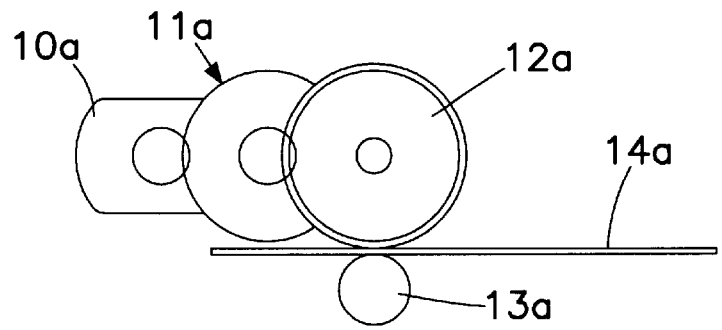
FIG. 2 is the side view of the conventional card transmission device.
Figure 1:
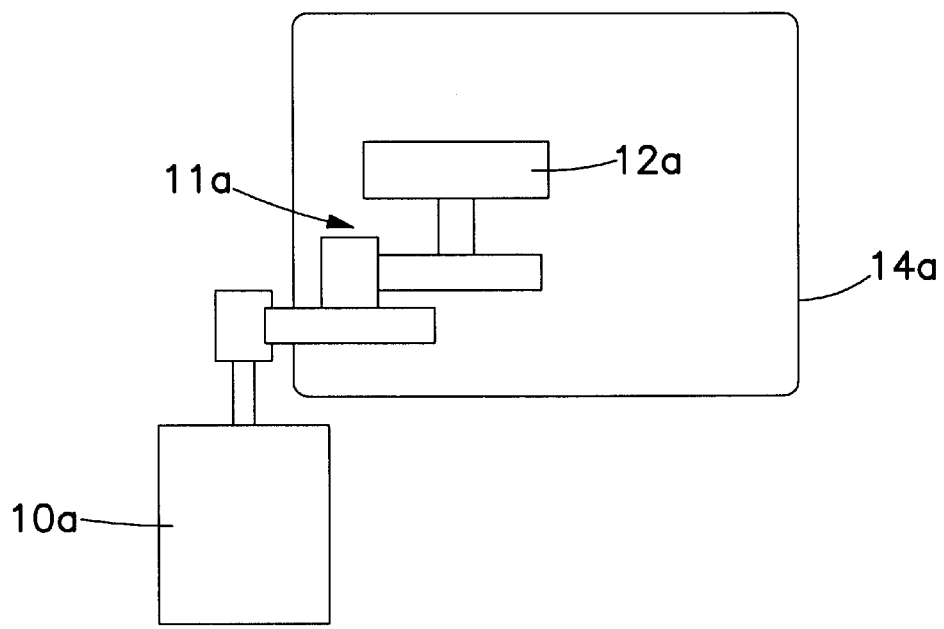
FIG. 1 is the top view if the conventional card transmission device.
Figure 3:
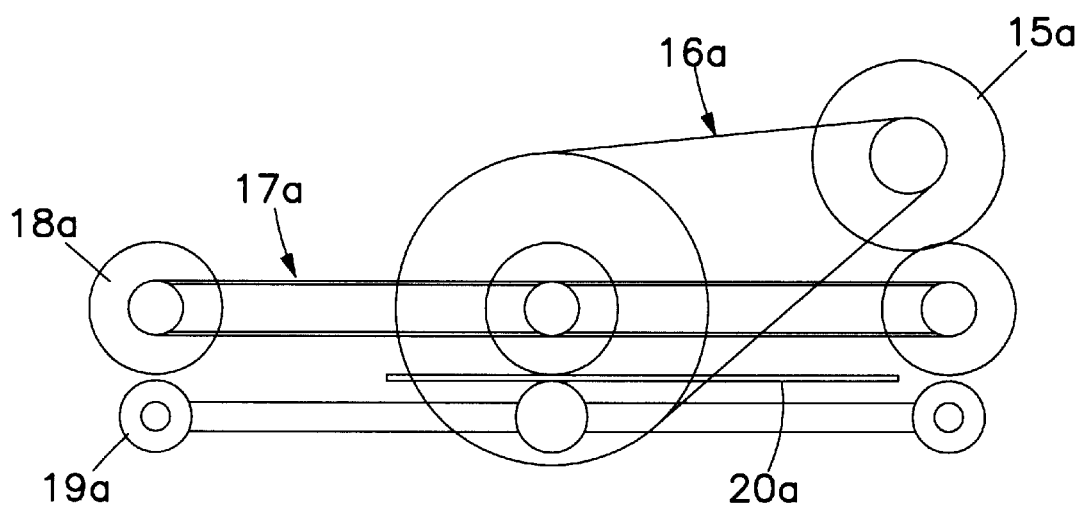
FIG. 3 is the side view of another conventional card transmission device.
Figure 5:
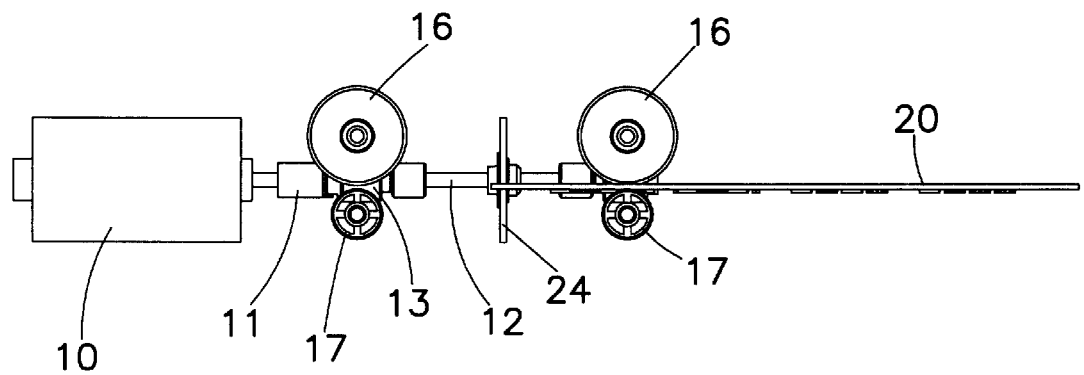
FIG. 5 is the side view of the invention.
Figure 4:
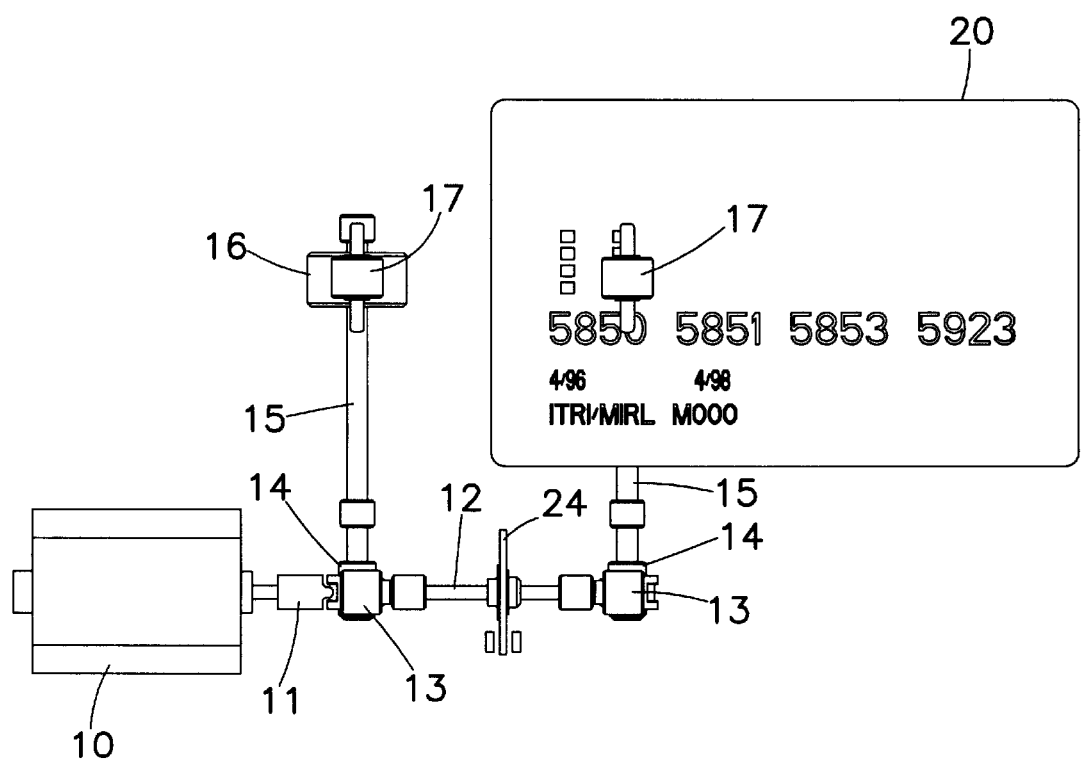
FIG. 4 is the top view of the invention.

As shown in FIGS. 4 and 5, the invention card transmission device is arranged within a card reader (not shown) and comprises a motor 10, shaft connector 11, worm shaft 12, worm 13, worm pulley 14, transmission shaft 15, transmission pulley 16 and driven pulley 17. The motor 10 is a DC motor arranged within the card reader. The shaft connector 11 is connected with the arbor of the motor 10. The worm shaft 12 is pivoted within the card reader and rotates freely. The worms 13 are arranged on both ends of the worm shaft 12. The shaft connector 11 is such engaged with the worm 13 so that the power of the motor 10 can be conveyed to the worm shaft 12 and the transmission shafts 15 through the shaft connector 11.

The two transmission shafts 15 are such pivoted within the card reader that they can rotate freely. The transmission shaft 15 is perpendicular to the worm shaft 12, and has one end connected to the worm pulley 14 another end and is connected to the transmission pulley 16. The transmission pulley 16 can be a rubber pulley, or a pulley with a rubber belt to move the card 20. The worm 13 is engaged with the worm pulley 14. Each transmission pulley 16 is provided with a driven pulley 17a on bottom side thereof. The driven pulley 17 is such pivoted within the card reader that it can rotate freely.

To move the card to be accessed steadily, the motor 10 first transmits power to the worm 13 through the shaft connector 11. The worm 13 moves another worm 13 through the worm shaft 12, and moves the worm pulleys 14 simultaneously, thus making the front and rear transmission shafts 15 rotate. Therefore, the transmission pulleys 16 and the driven pulleys 17 on the transmission shafts 15 can clamp and steadily move the card 20.

The present invention employs the worm 13 and the worms pulleys 14 with a high deceleration feature to replace the conventional driving pulley with ordinary deceleration ability. Moreover, the engagement of the worms 13 on both ends of the worm shaft 12 with the worm pulleys 14 on one end of the transmission shafts 15 can have the same length of action provided by the conventional belt.

Figure 7:
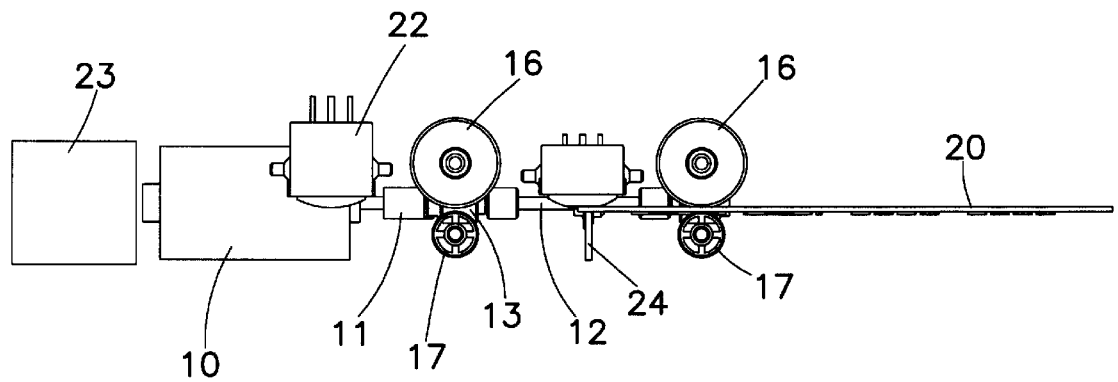
FIG. 7 is the top side view of the magnetic head in the invention.
Figure 6:
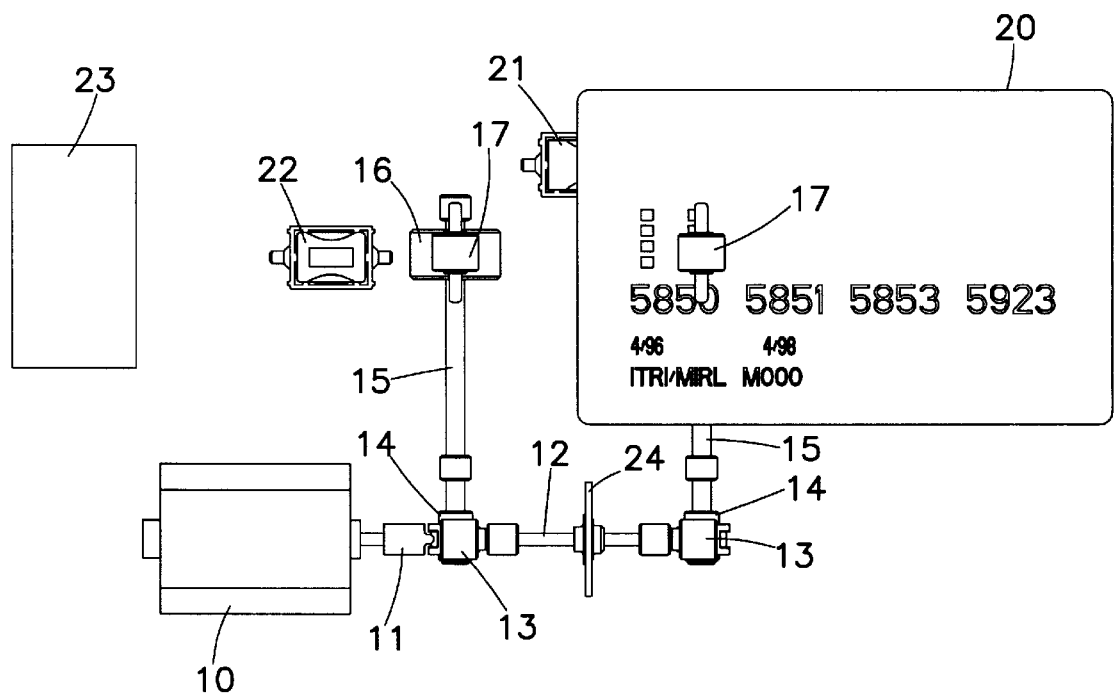
FIG. 6 is the top view of the magnetic head in the invention.

As shown in FIGS. 6 and 7, the inventive transmission device is transmitted by multiple pulleys 16, and a magnetic head 21 is placed outside the transmission shaft 15 to access the ISO 7811 magnetic card. Moreover, a magnetic head 22 may be placed behind the transmission shaft 15 to access an all-magnetic card (thinner card). Moreover, the problem of deforming thinner cards due to the height difference will not occur because of the use of multiple transmission pulleys 16, and the driven pulley 17 with astringent design. Therefore, the inventive transmission device is also applicable for the access of all-magnetic cards (thinner card). Moreover, an IC connector 23 may be placed behind the transmission shaft 15 for the access of ISO 7816 IC cards. Therefore, the invention has a broad application for magnetic cards (ISO 7811), IC cards (ISO 7816) and all-magnetic cards. Moreover, the invention is compact and does not have the problem of limited lifetime of belt set.

Moreover, as shown in FIGS. 4–7, the encoder 24 can be easily installed directly behind the motor 10, ahead of motor 10, or on the worm shaft 12, while the encoder in the prior art is required to be installed behind the motor or be moved by a pulley.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed:

1. A transmission device for a card reader, comprising:
   a motor;
   a first worm connected to said motor;
   a second worm;
   a worm shaft having said first worm placed at one end thereof and having said second worm placed at another end thereof;
   a first worm pulley connected to said first worm, and a second worm pulley connected to said second worm;
   a first transmission pulley connected to said first worm pulley, and a second transmission pulley connected to said second worm pulley; and
   a first driven pulley placed below said first transmission pulley, and a second driven pulley placed below said second transmission pulley;
   wherein said motor synchronously drives said first and second transmission pulleys and said first and second driven pulleys through said first and second worms and worm pulleys to move a card to be accessed.

2. The transmission device for a card reader as in claim 1, wherein said first worm is engaged with said first worm pulley and said second worm is engaged with said second worm pulley.

3. The transmission device for a card reader as in claim 1, further comprising first and second transmission shafts having said first and second worms respectively arranged on one end thereof.

4. The transmission device for a card reader as in claim 3, further comprising a magnetic head provided outside or behind said transmission shafts.

5. The transmission device for a card reader as in claim 3, further comprising an IC connector provided behind said transmission shafts.

6. The transmission device for a card reader as in claim 3, wherein said first and second transmission pulleys are arranged on another end of said respective first and second transmission shafts.

7. The transmission device for a card reader as in claim 6, wherein said transmission pulleys are rubber pulleys, or a belt-pulleys with a rubber belt.

8. The transmission device for a card reader as in claim 6, further comprising a magnetic head provided outside or behind said transmission shaft.

9. The transmission device for a card reader as in claim 6, further comprising an IC connector provided behind said transmission shafts.

10. The transmission device for a card reader as in claim 1, further comprising a connector provided on one end of said motor, said connector being connected to one end of said first worm.

11. The transmission device for a card reader as in claim 1, further comprising an encoder provided on said worm shaft.

* * * * *